US006728852B1

(12) United States Patent
Stoutamire (10) Patent No.: US 6,728,852 B1
(45) Date of Patent: Apr. 27, 2004

(54) METHOD AND APPARATUS FOR REDUCING HEAP SIZE THROUGH ADAPTIVE OBJECT REPRESENTATION

(75) Inventor: David P. Stoutamire, San Juan Bautista, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 709 days.

(21) Appl. No.: 09/608,312

(22) Filed: Jun. 30, 2000

(51) Int. Cl.⁷ .............................................. G06F 12/00
(52) U.S. Cl. .................... 711/170; 711/100; 707/104.1
(58) Field of Search ................................. 711/100, 154, 711/170; 707/104.1, 206

(56) References Cited

U.S. PATENT DOCUMENTS

| | | | |
|---|---|---|---|
| 5,245,337 A | * 9/1993 | Bugajski et al. | 341/51 |
| 5,293,164 A | * 3/1994 | Bugajski et al. | 341/51 |
| 5,699,539 A | 12/1997 | Garber et al. | |
| 5,704,060 A | * 12/1997 | Del Monte | 707/104.1 |
| 5,708,429 A | * 1/1998 | Antoniol et al. | 341/65 |
| 5,793,937 A | * 8/1998 | Chura et al. | 358/1.16 |
| 5,909,579 A | 6/1999 | Agesen et al. | |
| 6,051,027 A | * 4/2000 | Kapur et al. | 703/5 |
| 6,192,191 B1 | * 2/2001 | Suga et al. | 386/120 |
| 6,208,347 B1 | * 3/2001 | Migdal et al. | 345/419 |

OTHER PUBLICATIONS

Wilson, Paul R., "Pointer Swizzling At Page Fault Time: Efficiently Supporting Huge Address Spaces On Standard Hardware," Technical Report UIC–EECS–90–6, Dec. 1990.

* cited by examiner

Primary Examiner—Tuan V. Thai
(74) Attorney, Agent, or Firm—Beyer Weaver & Thomas, LLP (57) ABSTRACT

Methods and apparatus for creating compressed versions of regular objects are disclosed. According to one aspect of the present invention, a method for creating a compressed version of an object that stores a first representation of a set of data on a heap structure of an object-based computing system includes determining when the first representation of the set of data is suitable for compression. If the first representation of the set of data is compressible, it is compressed to form a second representation of the set of data, and a second portion of memory is allocated on the heap structure. The second portion of memory is substantially smaller than a first portion of memory occupied by the object. Finally, the method includes writing the second representation of the set of data into the allocated second portion of memory. In one embodiment, the method includes resetting a pointer that identifies the object to identify the allocated second portion of memory, and removing the object from the heap structure.

32 Claims, 8 Drawing Sheets

METHOD AND APPARATUS FOR REDUCING HEAP SIZE THROUGH ADAPTIVE OBJECT REPRESENTATION

BACKGROUND OF THE INVENTION

1. Field of Invention

The present invention relates generally to object-based computing systems. More particularly, the present invention relates to storing objects in compressed formats on memory heaps within an object-based computing system.

2. Description of the Related Art

The use of computer systems which share resources across a network of computer systems, e.g., local area networks, intranets and internets, is increasing. To facilitate the sharing of resources, objects are often implemented within computer systems. Object-based computing systems are often arranged such that objects may be shared between different processes on a network.

Figure 1:
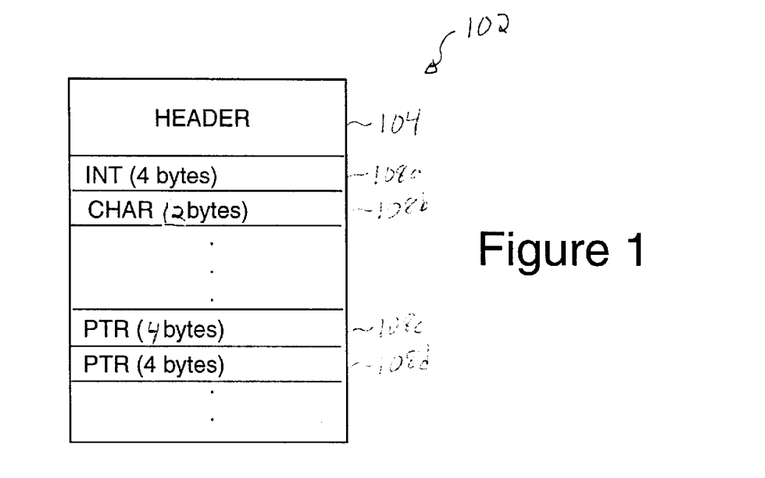
FIG. 1 is a diagrammatic representation of a conventional object.

An object typically includes a set of operations and a state which essentially "remembers" the effect of the operations. In general, an object may be considered to be one form of a function that includes memory. FIG. 1 is a diagrammatic representation of a conventional object. An object 102 includes a header 104 and multiple data fields 108. Header 104 is typically a word that stores object-related information. The object-related information often includes other information such as hash values that identify the object and garbage collection information.

Data fields 108 may contain substantially any data which may be used by a process when the process invokes object 104. Data fields 108 typically include fields which hold integer data, e.g., field 108a, fields which hold character data, e.g., field 108b, and fields which hold pointers, e.g., fields 108c and 108d. In general, as will be appreciated by those skilled in the art, most fields 108 within object 102 are pointer fields which contain pointers to other objects.

Integer field 108a is typically four bytes long, i.e., integers contained within integer field 108a occupy four bytes, while character field 108b is typically two bytes long, i.e., characters contained within character field 108b occupy two bytes. Pointer field 108c is arranged to include an address of a different object that is referenced by object 102. The address, or pointer, contained within pointer field 108c generally occupies four bytes. In other words, pointer field 108c is four bytes long.

Memory space in computing systems such as object-based systems is often limited. In particular, objects which are allocated by and used by programs generally occupy a significant portion of the memory required to execute a program. A computing system that is capable of executing multiple applications may suffer a failure when there is not enough memory available to execute a necessary application or program. In addition, an application or a program may not run as expected, e.g., may run slowly, when insufficient memory is available to that application or program. That is, when the memory required to execute a program exceeds the size of a cache, the program may execute significantly slower than expected.

Although it may be possible to add more memory to some computing systems in order to alleviate memory issues, adding memory to other systems may be impractical and, in some cases, physically impossible. For example, for a small device such as a hand-held computing device, a personal digital assistant, or a cell phone, there is often not enough space within the device to accommodate additional memory. Reducing the amount of memory required to enable a program to run would result in better performance of the program and, potentially, other programs since more memory would conceivably be available for use by the other programs. Therefore, what is desired is an efficient method and apparatus for reducing the amount of memory consumed by a program.

SUMMARY OF THE INVENTION

The present invention relates to a heap structure which includes a heap for full-size objects and a heap for reduced-size objects. Using reduced-size objects reduces the amount of memory used by applications or programs executing within an object-based computing system, thereby increasing the performance associated with the object-based computing system. According to one aspect of the present invention, a method for creating a compressed version of an object that stores a first representation of a set of data on a heap structure of an object-based computing system includes determining when the first representation of the set of data is suitable for compression. If the first representation of the set of data is compressible, it is compressed to form a second representation of the set of data, and a second portion of memory is allocated on the heap structure. The second portion of memory is substantially smaller than the amount of memory occupied by the object, e.g., is smaller than a first portion of memory occupied by the object. Finally, the method includes writing the second representation of the set of data into the allocated second portion of memory. In one embodiment, the method includes resetting a pointer that identifies the object to identify the allocated second portion of memory, and removing the object from the heap structure.

In a second embodiment, the allocated second portion of memory is a compressed object, and the method also includes writing information into a field associated with the compressed object. In such an embodiment, writing the information includes determining when the information is compressible, and allocating a third portion of memory on the heap structure when the information is not compressible. The allocated third portion of memory is substantially larger than the compressed object. A pointer is set to find the allocated third portion of memory from the compressed object, and the second representation of the data is stored into the allocated third portion of memory. Then, the information is stored into the allocated third portion of memory at an appropriate field.

According to another aspect of the present invention, a method for performing garbage collection within an object-based computing system includes traversing at least one heap structure associated with the object-based computing system, and copying an object that is located on the heap structure. The object includes a first representation of a set of information, and copying the object includes determining when the object may be represented as a compressed format object that is substantially smaller in size than the object. In one embodiment, determining when the object may be represented as the compressed format object includes determining when a second representation of the set of information may be created as a compressed version of the first representation.

In another embodiment, copying the object involves creating the second representation of the set of information by reducing the number of bytes associated with the set of information, and allocating memory space on the heap structure. The amount of memory space allocated is less than an amount of memory space associated with the object. The second representation may then be stored in the memory space allocated on the heap structure.

According to still another embodiment of the present invention, a memory for storing objects within an object-based computing system includes a first heap and a second heap. The first heap stores an uncompressed object of a first size, and includes a first representation of an amount of information. The second heap stores a compressed object of a second size, and includes a second representation of the amount of information. The second size is substantially smaller than the first size. In one embodiment, the second size is in the range of approximately one fourth to approximately one half the size of the first size.

In another embodiment, the first representation includes a reference to an object stored within the memory. In such an embodiment, the reference may be an address location of the object and the second representation may include a reference to the object that is represented as a difference between the address location of the first object and an address location of the compressed object.

These and other advantages of the present invention will become apparent upon reading the following detailed descriptions and studying the various figures.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

The performance of an object-based computing system is based, at least in part, upon the ability of programs associated with the computing system to execute. Often, when there is insufficient memory available to execute a program, the computing system may suffer a failure. Also, insufficient memory may cause a program to run inefficiently or slowly, e.g., when the required amount of memory exceeds the memory available in a cache.

By reducing the amount of memory use by a program during execution, the efficiency with which a computing system operates would be increased. Further, there would be less of a need to physically increase the amount of memory to accommodate the needs to the computing system.

In one embodiment, to reduce the amount of memory used by a program, the size of at least some objects used by a program may be adaptively reduced. For example, an object may be reduced in such that a "reduced-sized" object is as small as approximately one fourth the size of a "full-sized," or regular, object. In some cases, it should be appreciated that the reduced-sized object may be somewhat smaller than one fourth the size of a regular object. Reducing the size of at least some objects in a system, such as those objects with fields which may be represented with a reduced number of bytes, allows memory space to be more efficiently used within the system. Hence, the size of heaps used to execute programs may be significantly reduced.

A system which supports both full-sized, or "uncompressed," objects and reduced-sized, or "compressed," objects may include a heap structure which stores the uncompressed objects and compressed objects substantially separately. Although compressed objects may be created at any suitable time, creating the compressed objects during a garbage collection process may increase the efficiency with which the compressed objects are adaptively created. As will be understood by those skilled in the art, a garbage collection process is used to reclaim memory resources associated with objects which are no longer needed to correctly execute a computer program. Specifically, the act of reclaiming unused or "garbage" objects is commonly referred to as garbage collection, while an automatic storage-reclamation system is often referred to as a garbage collector.

During garbage collection processes, a garbage collector typically eventually "visits" or studies all objects. As a result, the performance penalty associated with studying or altering objects is typically low. That is, it is typically relatively inexpensive to access objects during garbage collection. For example, objects may be moved within memory, e.g., a heap, with no significant performance-added penalty during garbage collection.

During the copying phase of some garbage collection processes, objects may be copied, e.g., to different sections of a heap. If an uncompressed object is effectively translated into a compressed object during a copying phase, then the compressed object may be created without incurring a significant performance penalty. Once a compressed object is created, the corresponding uncompressed object typically becomes a garbage object and, hence, may be removed by a garbage collector.

Figure 2A:
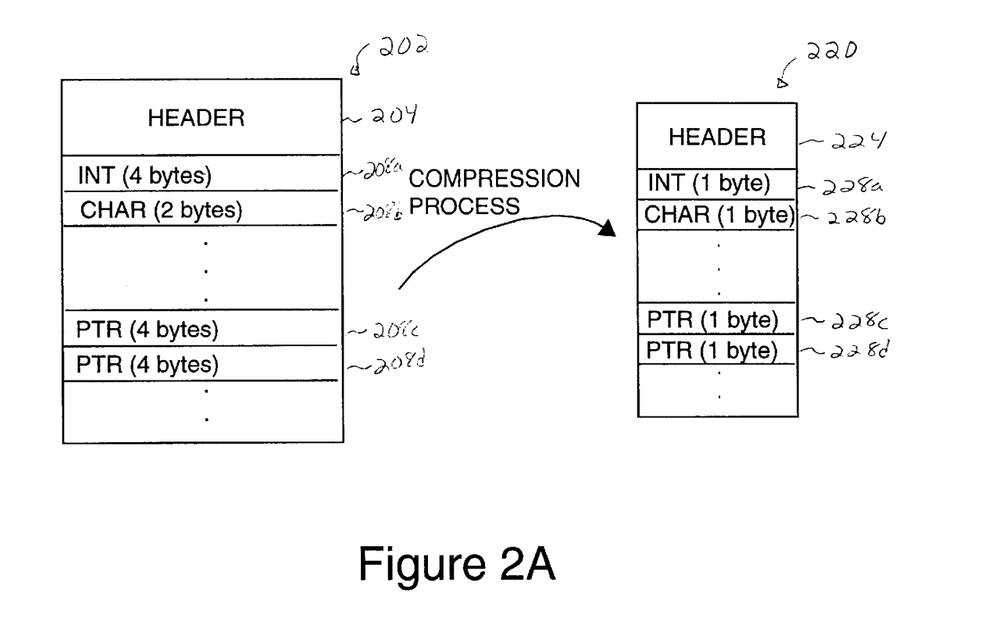
FIG. 2A is a diagrammatic representation of an uncompressed object and a compressed version of the object after a compression process in accordance with an embodiment of the present invention.

With reference to FIG. 2A, a compressed object will be described in comparison with an associated uncompressed object in accordance with an embodiment of the present invention. An uncompressed object 202 generally includes a header 204 and a variety of fields of data 208. The fields of data 208 may include, but are not limited to, integers, characters, and pointers.

In some cases, uncompressed object 202 may be suitable for a compression process to create a compressed object 220 which corresponds to uncompressed object 202. Specifically, fields 208 within object 220 may contain data which may be compressed or otherwise transformed in order to reduce the number of bytes and, hence, the amount of space, occupied by the data. One suitable compression process that may be used to create compressed object 220 will be discussed below with respect to FIG. 3.

Typically, compressed object 220 is substantially smaller, e.g., occupies significantly less heap space, than uncompressed object 202. In the described embodiment, compressed object 220 is approximately one fourth the size of uncompressed object 202, although it should be appreciated that the size of compressed object 220 relative to uncompressed object 202 may vary widely depending upon the requirements of a particular application. For instance, the size of compressed object 220 relative to uncompressed object 202 may be expressed as an exponential function, e.g., uncompressed object 202 may be larger than compressed object 220 by a factor of $2^n$ where "n" is substantially any positive integer.

Compressed object 220 is arranged to include substantially all information that is included in uncompressed object 220. In one embodiment, every field 208 in uncompressed object 220 has a corresponding field 228 in compressed object 220. Similarly, fields 228 within compressed object 220 are positioned to correspond to the locations of fields 208 within uncompressed object 202 such that fields 228 may readily be located within object 220. By way of example, integer field 208a corresponds to integer field 228a and pointer field 208c corresponds to pointer field 228c. In general, in order for integer field 208a to be considered to be compressible from a size of four bytes to a size of one byte, integer field 208a contains an integral value that is relatively close to zero, e.g., an integral value that may fall between -128 and 127.

Fields 208 within uncompressed object 202 generally include multiple pointer fields 208c, 208d. Hence, as will be understood by those skilled in the art, objects which are the targets of pointer fields 208c, 208d, i.e., "pointee" objects, are located relatively near object 202. Specifically, many garbage collection algorithms effectively reorganize objects such that objects which are referenced by a first object are located near the first object in an overall heap.

As previously mentioned, a compressed object is generally created during a garbage collection process. When a garbage collection process occurs, a heap structure on which objects 202, 220 are located is typically traversed in a depth-first manner such that objects which reference one another are placed together. Such a traversal may be part of a train garbage collector, as described in *Garbage Collection: Algorithms for Automatic Dynamic Memory Management* by Richard Jones and Rafael Lins (John Wiley & Sons Ltd., 1996), which is incorporated herein by reference in its entirety.

When objects are clustered together, the address locations of the objects are generally close to each other. By way of example, an object pointed to by the contents of pointer field 208c is likely to have an address that is not far from an address associated with uncompressed object 202. Hence, once compressed object is created 220, since a garbage collection process is such that compressed object 220 may be located relatively near the object pointed to by the contents of pointer field 208c, the contents of pointer field 228c may reflect a difference between the location of the pointee object and the location of compressed object 220. Typically, such a difference may be expressed using one or two bytes.

During a garbage collection process, after compressed object 220 is created, uncompressed object 202 effectively becomes a garbage object. Accordingly, the garbage collection process may remove uncompressed object 202, and any pointers to uncompressed object 202, from the overall heap or heap structure.

In the described embodiment, an overall heap within computer memory is divided into two sections, i.e., a heap section for uncompressed objects and a heap section for compressed objects. Hence, uncompressed object 202 is stored is stored in the heap section for uncompressed objects while compressed object 220 is stored in the heap section for compressed objects. Although the relative sizes of the heap sections may vary widely, the heap section allocated to compressed objects is often significantly smaller than the heap section allocated to uncompressed objects.

Once compressed object 220 is created, compressed object 220 may be read from and written to. One process of reading from an object which may be compressed will be described below with respect to FIG. 4, while one process of writing to an object that may be compressed will be discussed below with respect to FIGS. 5A and 5B.

When writing to compressed object 220, data that is to be written into a field 228 of compressed object 220 may be unsuitable for compression. That is, data that is to be written into a field 228 of compressed object 220 may not fit into the field 228. In such a situation, compressed object 220 is typically "uncompressed" to accommodate the uncompressible data.

Although the uncompressing of a compressed object may be accomplished in a variety of different ways, in one embodiment, uncompressing a compressed object includes creating an uncompressed version of the object, then adding a forwarding pointer to the compressed object which identifies the uncompressed version of the object. The compressed object, as well as the forwarding pointer, may then be removed during a subsequent garbage collection. The subsequent garbage collection will generally also reset any pointers, which previously identified the compressed object, to identify the uncompressed version of the object.

Figure 2B:
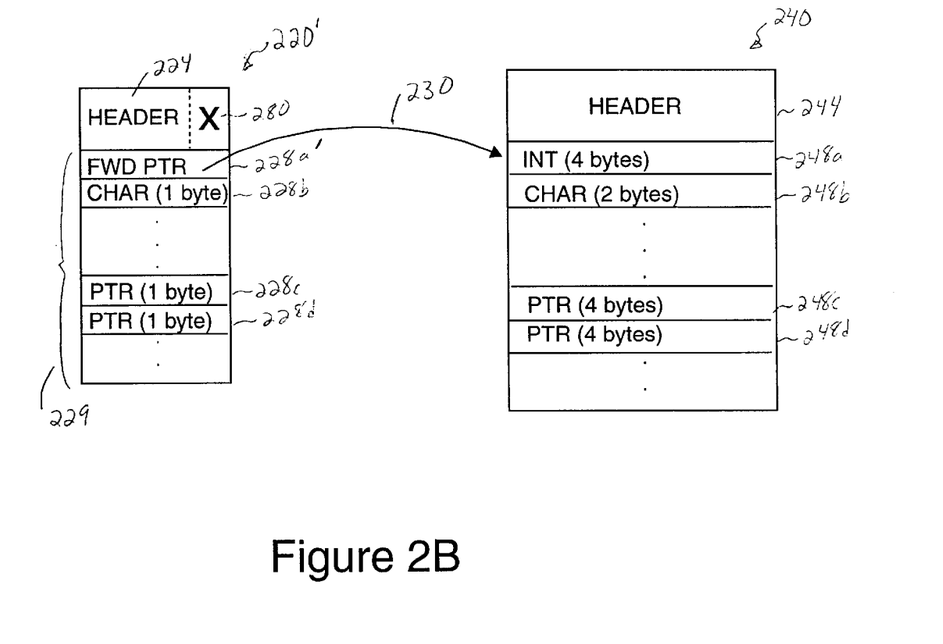
FIG. 2B is a diagrammatic representation of a compressed object, i.e., compressed object 220 of FIG. 2A, with a header bit and a forwarding pointer which identifies an uncompressed object in accordance with an embodiment of the present invention.

FIG. 2B is a diagrammatic representation of a compressed object and a corresponding uncompressed object created after the creation of compressed object in accordance with an embodiment of the present invention. Header 204 of compressed object 220' includes an identifier 280 that is arranged to identify the existence of a forwarding pointer 230 that identifies uncompressed object 240. In the described embodiment, identifier 280 is a bit, although identifier 280 may generally take on a variety of other formats, e.g., identifier 280 may be a word.

Uncompressed object 240 includes fields 248 which correspond to fields 228 included in compressed object 220'. Typically, when uncompressed object 240, which is pointed to from compressed object 220' through forwarding pointer 230, is in existence, the indication is that at least one of fields 228 in compressed object 220' has been updated in uncompressed object 240. That is, uncompressed object 240 is arranged to contain more "recent," or up-to-date, information than is contained in compressed object 220'. Specifically, uncompressed object 240 is typically created when it is not possible to compress data which was intended to be written to compressed object 220'. Once the uncompressed object 240 is created, the uncompressible data is written to uncompressed object 240, and forwarding pointer 230 is established.

In one embodiment, forwarding pointer 230 may be placed in a first field 228a' in a body 229 of object 220'. It should be appreciated, however, that forwarding pointer 230 may be placed in substantially any field 228 located in body 229. Further, identifier 280 may be arranged to identify the field 228 in which forwarding pointer 230 is located, in addition to identifying the existence of uncompressed object 240.

Figure 3:
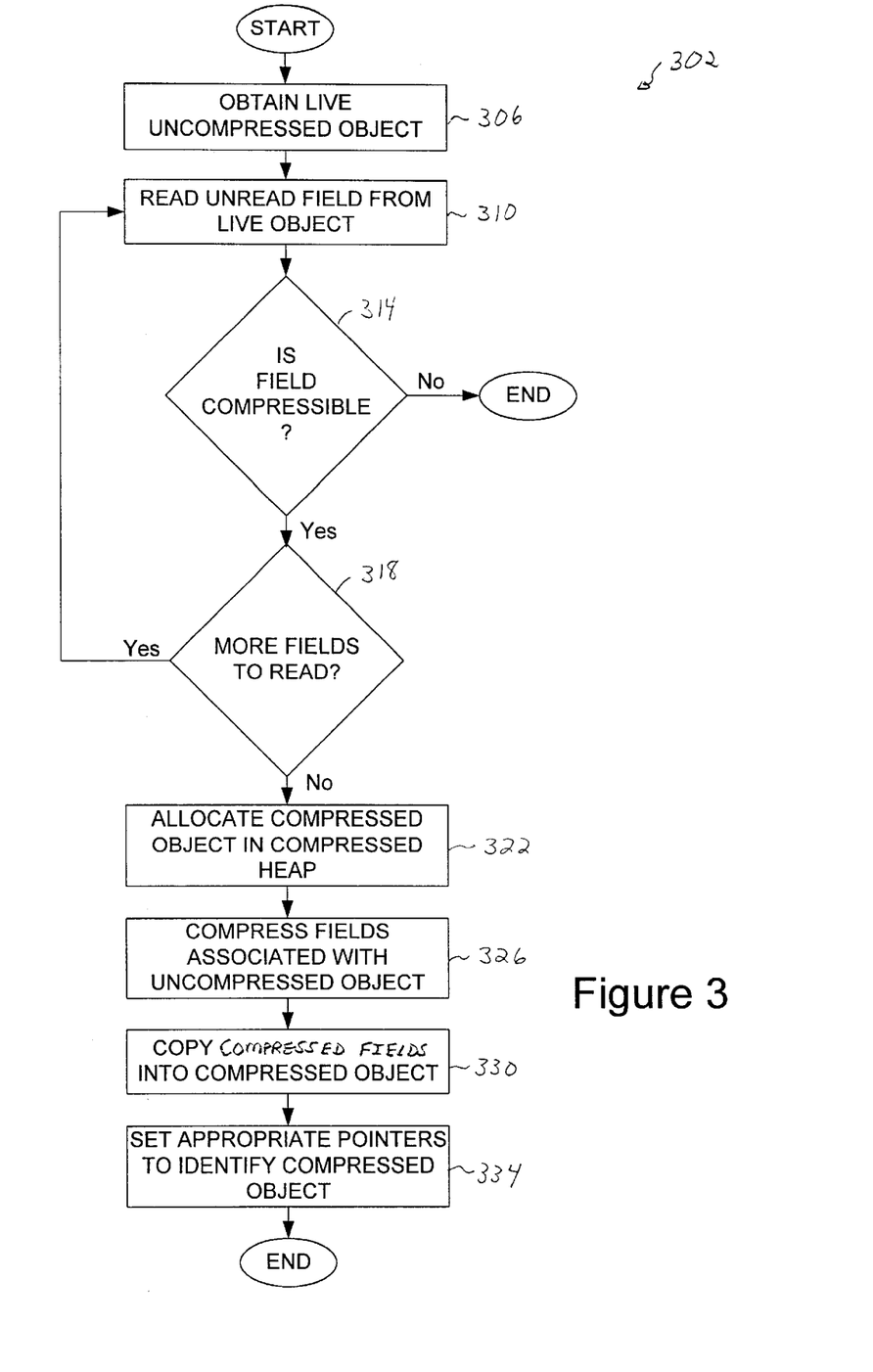
FIG. 3 is a process flow diagram which illustrates the steps associated with compressing an object in accordance with an embodiment of the present invention.

Referring next to FIG. 3, a process of creating a compressed object representation of an uncompressed object will be described in accordance with an embodiment of the present invention. A process 302 of compressing an object begins at step 306 in which a live, uncompressed object is obtained. In other words, a "regular" or "ordinary" object such as object 202 of FIG. 2A may be obtained. Although a live, uncompressed object may be obtained at substantially any suitable time, in one embodiment, the live, uncompressed object is obtained at garbage collection time. Specifically, the uncompressed object may be obtained during a copying phase of a garbage collection process.

Once an uncompressed object is obtained, a field is read from the object in step 310. A determination is made in step 314 as to whether the field that is read is compressible. In general, a variety of different factors may be used to determine whether a field is suitable for compression. Such factors may include, but are not limited to, determining whether an integer in an integer field may be accurately represented by one or two bytes, and determining whether a pointer in a pointer field may be represented as a difference between the address of the storage location that holds the pointer and the target of the pointer.

When it is determined that a field is not compressible, then the indication is that the uncompressed object may not be compressed. Hence, the process of compressing an object is terminated. Alternatively, when the determination in step 314 is that the field is compressible, the process flow moves to step 318 where it is determined whether the uncompressed object contains more, e.g., previously unread, fields to be read. If it is determined that the uncompressed object includes more fields to be read, then process flow returns to step 310. If it is determined that substantially all the fields in the uncompressed object have already been read, then the indication is that the fields in the uncompressed object are substantially all compressible. Accordingly, a compressed object is allocated in a compressed heap, i.e., a heap that contains compressed objects, in step 322.

As discussed above with respect to FIGS. 2A and 2B, a system which supports both compressed objects and uncompressed objects includes a heap which stores compressed objects and a heap which stores uncompressed objects. Hence, allocating a compressed object in the compressed heap generally includes setting aside a section of heap space. The size of the section of heap space that is set aside may vary. By way of example, the size of the section may be approximately one fourth of the size of the heap space occupied by the uncompressed object in a heap that contains uncompressed objects.

After the compressed object is allocated in step 322, the fields associated with the uncompressed object are compressed in step 326. It should be appreciated that substantially any suitable method may be used to compress or otherwise translate the fields of an object. In general, however, compressing the fields includes reducing the size of the contents stored in the fields by packing the information. For example, the contents of a four byte field may be packed down to one or two bytes. When a field includes a signed integer, compressing the field may involve representing the integer as a single signed byte. If a field includes a pointer, compressing the field may involve determining the offset between the address associated with the field and the address of an object which is pointed to by the pointer.

Once the fields are compressed in step 326, the fields are copied into the compressed object in step 330. Finally, in step 334, appropriate pointers are set to identify the compressed object. Setting appropriate pointers may include resetting any pointers which identify the uncompressed object obtained in step 306 to identify the uncompressed object. After the appropriate pointers are set, the process of creating a compressed object representation of an uncompressed object is completed.

In general, objects within a system are accessed, e.g., by processes or other objects, either to read information contained within the object or to write information to the object. A method of reading information from an object that is part of a system which supports both compressed and uncompressed objects will be discussed with reference to FIG. 4, while a method of writing information to an object that is part of a system which supports both compressed and uncompressed objects will be discussed below with respect to FIGS. 5A and 5B.

Figure 4:
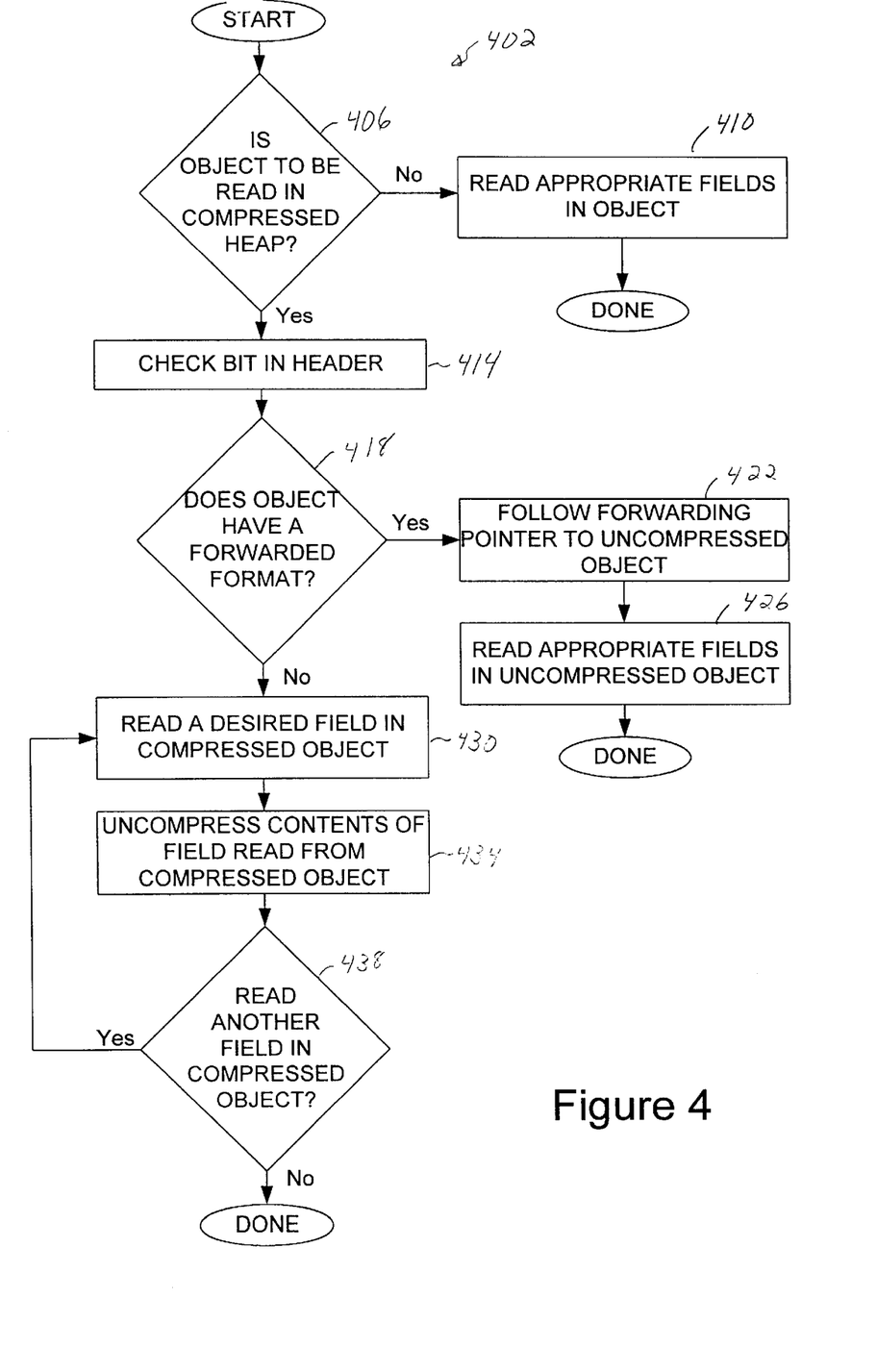
FIG. 4 is a process flow diagram which illustrates the steps associated with reading information contained in an object that is part of a system which supports compressed objects in accordance with an embodiment of the present invention.

FIG. 4 is a process flow diagram which illustrates the steps associated with reading information contained in an object that is part of a system which supports compressed objects in accordance with an embodiment of the present invention. A process 402 of reading information from an object begins at step 406 in which a determination is made regarding whether the object to be read is located in a compressed heap. If it is determined that the object to be read is not in a compressed heap, then the indication is that the object is an uncompressed object. Accordingly, process flow moves from step 406 to step 410 in which the appropriate fields are read from the object using any suitable method. Once the appropriate fields are read, the process of reading information contained in an object is completed.

Alternatively, if it is determined in step 406 that the object to be read is located in a compressed heap, then the implication is that the object has a compressed format. When the determination is that the object has a compressed format, then a bit in the header of the object is checked in step 414. The bit, e.g., bit 280 of FIG. 2B, may be arranged to indicate whether the object has a forwarded format, or an uncompressed version of itself.

After the bit in the header is obtained, a determination is made in step 418 as to whether the object to be read has a forwarded format. In other words, a determination is made regarding whether the object has effectively been uncompressed. If it is determined that the object has a forwarded format, the implication is that the object has effectively been uncompressed. Accordingly, a forwarding pointer is located within the object, and process flow moves from step 418 to step 422 where the forwarding pointer is followed to the corresponding uncompressed object. Once the uncompressed object is identified, the appropriate fields are read from the uncompressed object in step 426, and the process of reading information from an object are completed.

Returning to step 418, when it is determined that the object does not have a forwarded format, e.g., that the bit in the header indicates that there is no forwarding pointer, then process flow proceeds to step 430 where a desired field is read from the object or, more specifically, the compressed object. Once read, the contents of the field are uncompressed in step 434, using substantially any suitable method. After the contents of the field are uncompressed, a determination is made in step 438 as to whether there is another field in the object to be read. If it is determined that there is another field to be read, then process flow returns to step 430 in which the contents of a desired field are read. Alternatively, if it is determined in step 438 that there are no other fields to be read, then the process of reading information from an object is completed.

In addition to reading information from an object that may be compressed, information may also be written to an object that may be compressed. While data or information that is read from a compressed object is compressed information, unless the compressed object has a forwarded format, information that is to be written to a compressed object may not necessarily be compressible. In other words, an uncompressed version of a compressed object may essentially need to be created when data that is to be written to the compressed object is not compressible.

Figure 5A:
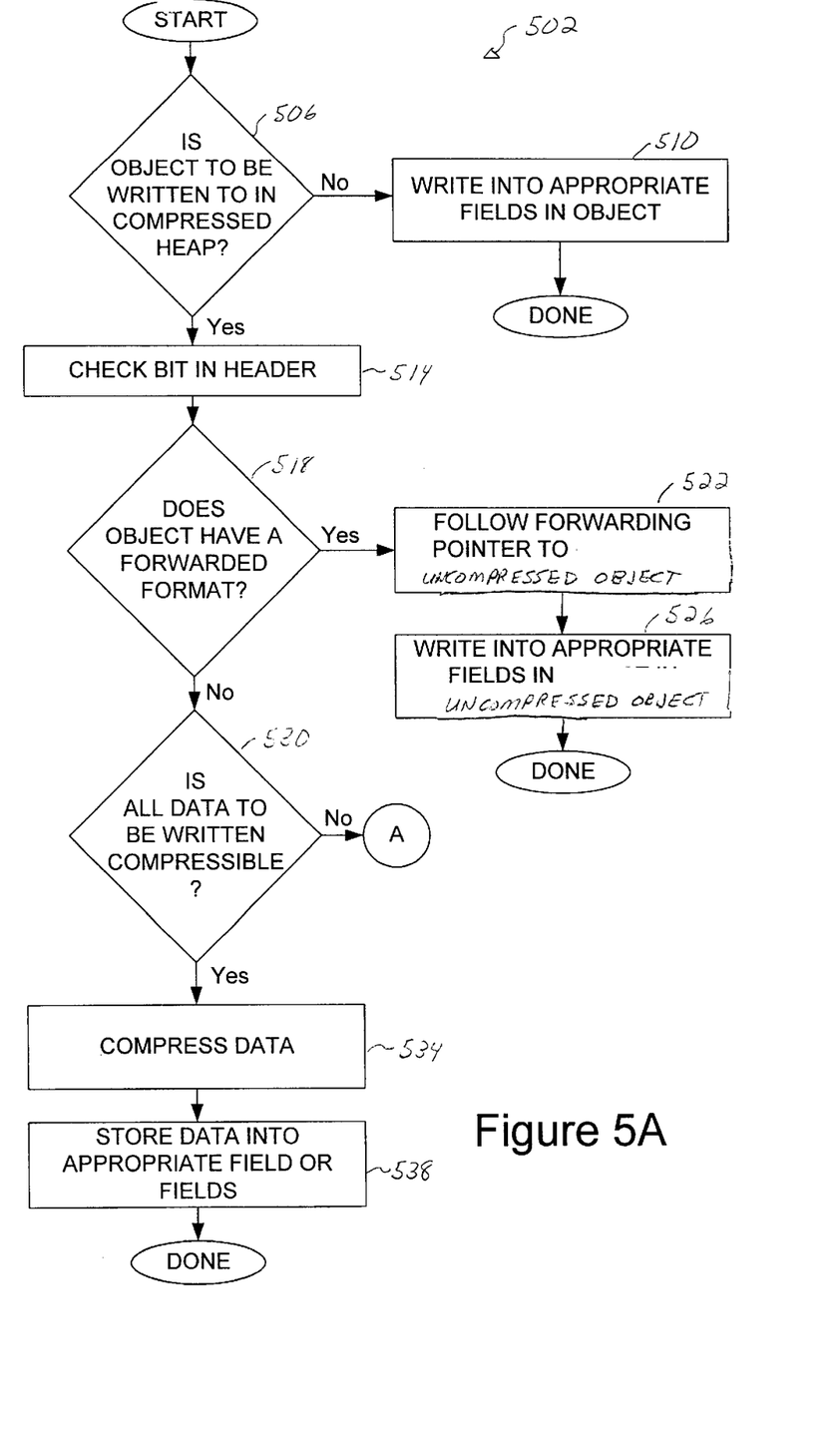
FIGS. 5A and 5B are a process flow diagram which illustrates the steps associated with writing to an object that is part of a system which supports compressed objects in accordance with an embodiment of the present invention.
Figure 5B:
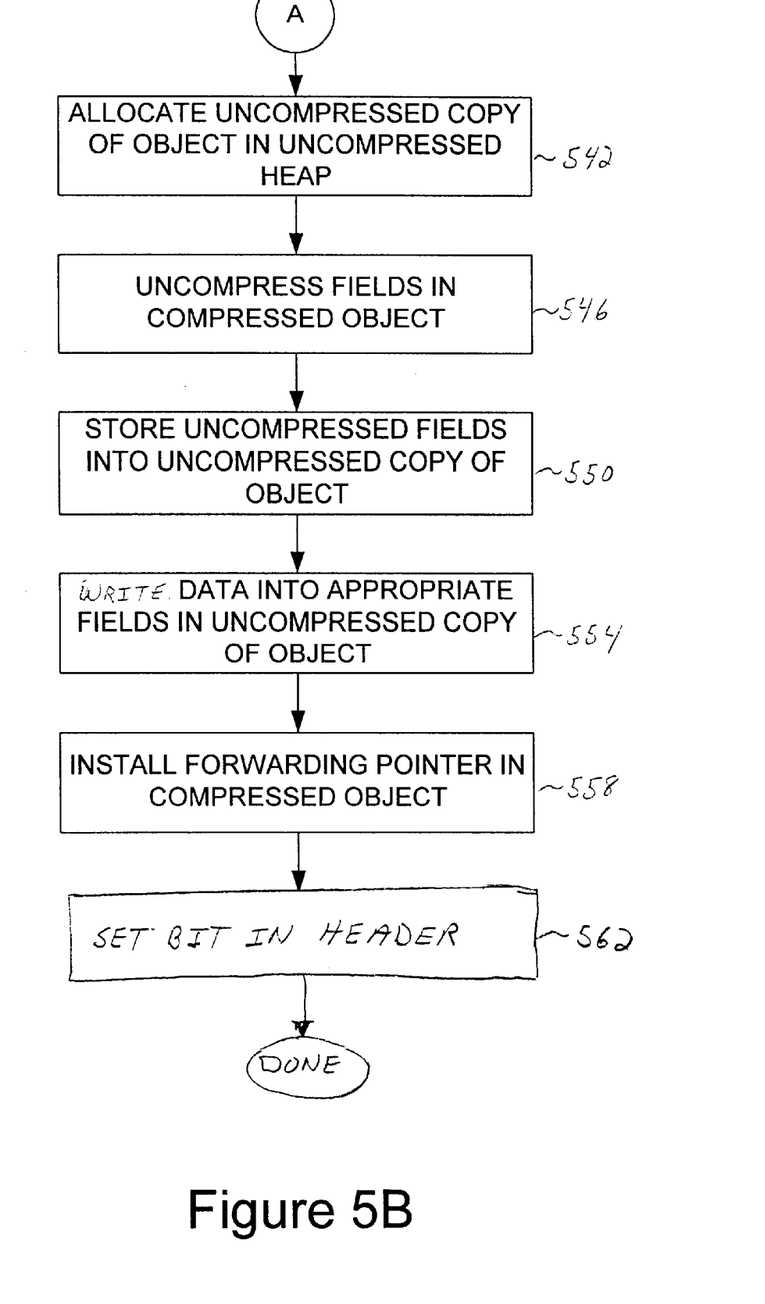

With reference to FIGS. 5A and 5B, one method of writing information to an object which is included in a system that supports both compressed and uncompressed objects will be discussed in accordance with an embodiment of the present invention. A process 502 of writing information to an object begins at step 506 where a determination is made regarding whether the object that is to be written to is located in a compressed heap. If it is determined that the object is not in a compressed heap, then the indication is that the object is not compressed. Hence, process flow moves from step 506 to step 510 in which the appropriate fields in the object are written to using substantially any suitable method, as will be appreciated by those of skill in the art. After the appropriate fields are written to, the process of writing to an object is completed.

Alternatively, when it is determined in step 506 that the object to be written to is located in a compressed heap, then the object to be written to may either be a compressed object or a compressed object with a forwarded format. Accordingly, a bit in the header of the object, which identifies whether the object has a forwarded format, is obtained and checked in step 514.

A determination is made in step 518 as to whether the object has a forwarded format. In one embodiment, such a determination is made using the bit obtained in step 514. If it is determined that the object has a forwarded format, then the indication is that there is an uncompressed object that corresponds to the object on the compressed heap and, further, that the object on the compressed heap includes a forwarding pointer to the uncompressed object. Accordingly, process flow moves to step 522 where the forwarding pointer is followed to the uncompressed object. Once the uncompressed object is located using the forwarding pointer, the appropriate fields in the uncompressed object are written to in step 526 using substantially any suitable method. After the fields are written to, the process of writing information to an object is completed.

On the other hand, if it is determined in step 518 that the object on the compressed heap does not have a forwarded format, then it is determined in step 530 whether all data or information to be written to the object is compressible. In other words, it is determined in step 530 whether the information to be written to the object may be transformed such that the transformed or compressed information fits into the appropriate fields allocated to the object.

When the determination in step 530 is that the information is compressible, then the information is compressed in step 534. The compressed information may then be written or stored into the appropriate field or fields of the object in step 538, at which point the process of writing information to an object is completed.

Alternatively, if the determination in step 530 is that not all information to be written to the object is compressible, then process flow moves from step 530 to step 542 in which an uncompressed copy of the object is allocated in a heap which contains uncompressed objects, i.e., an uncompressed heap. Although the amount of memory space, or heap space, that is allocated to the uncompressed copy of the object may vary, it should be understood that the uncompressed copy of the object may be significantly larger than the corresponding compressed object. By way of example, the uncompressed copy of the object may be in the range of approximately twice as large as the associated compressed object to approximately four times as large as the associated compressed object.

Figure 6:
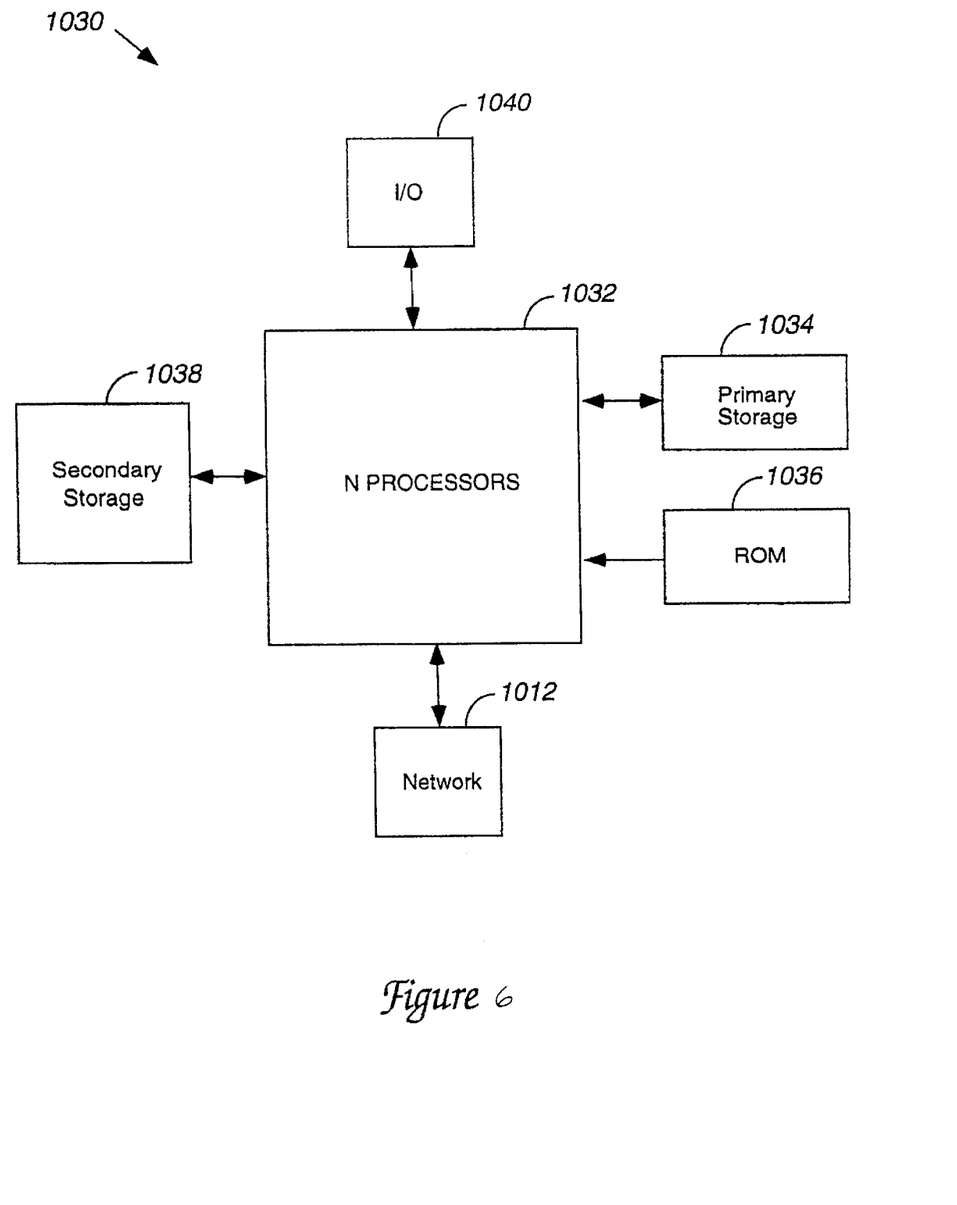
FIG. 6 is a diagrammatic representation of a computer system suitable for implementing the present invention.

After the uncompressed copy of the object is allocated in step 542, the fields stored in the compressed object may be read and uncompressed in step 546. The uncompressed fields are then stored into the uncompressed copy of the object in step 550, and the information which is be written to the object is stored into the appropriate fields within the uncompressed copy of the object. Once information or data is written or otherwise stored into the uncompressed copy of the object, a forwarding pointer is installed in the compressed object in 558. The forwarding pointer is generally arranged to identify the uncompressed copy of the object. After the forwarding pointer is installed, a bit in the header, e.g., the bit that was checked in step 514, is set in step 562 to indicate that the forwarding pointer installed in step 558 is present. When the bit in the header is set, the process of writing to an object is completed. It should be understood by those skilled in the art, for multi-threaded implementations, additional synchronization may be required to ensure atomicity of the process of writing FIG. 6 illustrates a typical, general-purpose computer system suitable for implementing the present invention. Specifically, FIG. 6 illustrates a computer system on which a heap for compressed objects and a heap for uncompressed objects may be allocated. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). Processor 1032 may execute instructions associated with a virtual machine and with applications. Primary storage devices 1034 may include dynamically allocated memory, i.e., memory associated with heaps allocated by a virtual machine. An example of a virtual machine will be described below with reference to FIG. 7.

Figure 7:
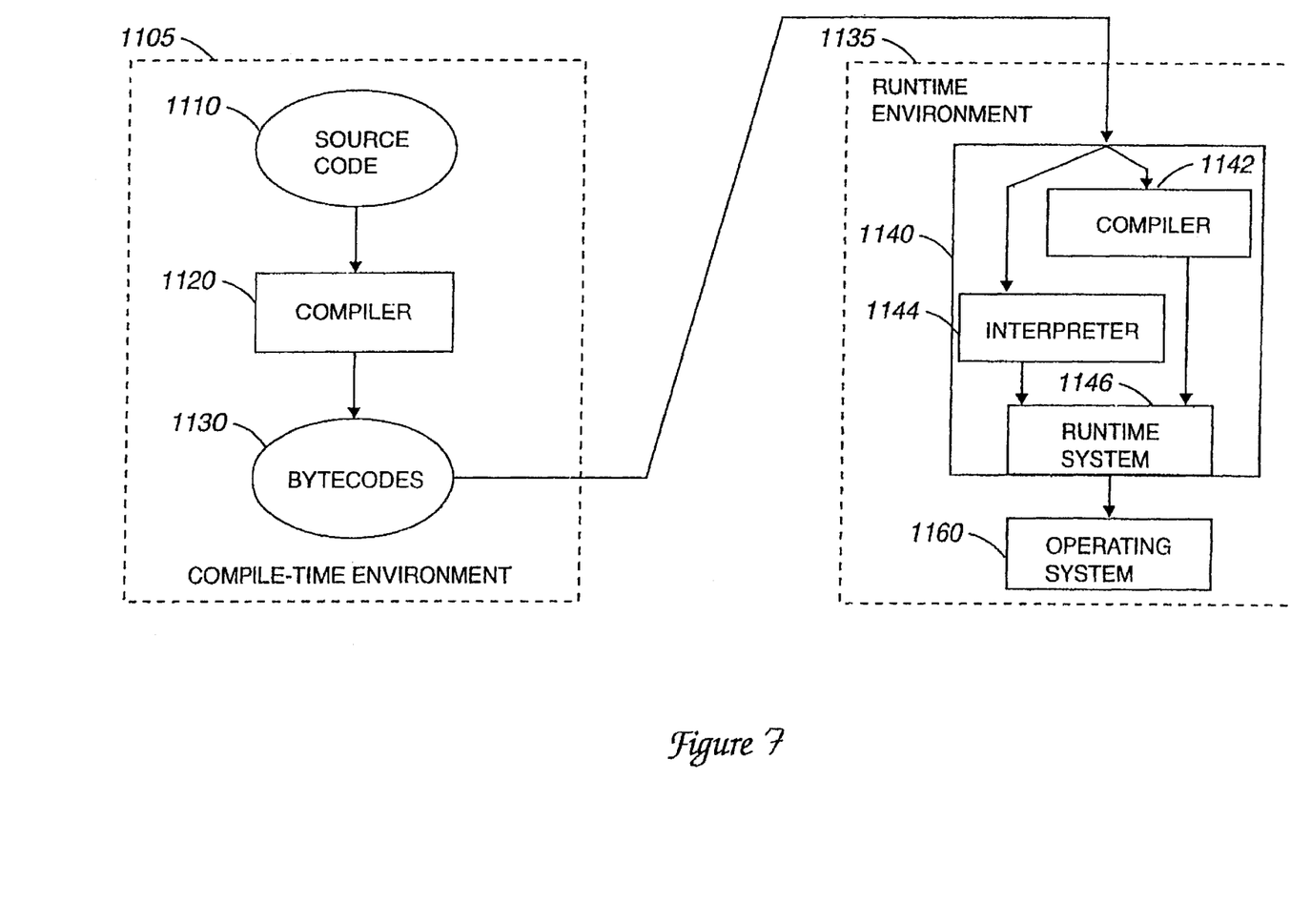
FIG. 7 is a diagrammatic representation of a virtual machine suitable for implementing the present invention.

Computer system 1030 or, more specifically, CPU 1032, may be arranged to support a virtual machine, as will be appreciated by those skilled in the art. As is well known in the art, ROM acts to transfer data and instructions unidirectionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The data storage capacity provided by secondary storage medium 1038 generally includes dynamically allocated memory. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data unidirectionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

As previously mentioned, a virtual machine which is suitable for allocating heaps may execute on computer system 1030. FIG. 7 is a diagrammatic representation of a virtual machine which is supported by computer system 1030 of FIG. 6, and is suitable for implementing the present invention. When a computer program, e.g., a computer program written in the Java™ programming language developed by Sun Microsystems of Mountain View, Calif., is executed, source code 810 is provided to a compiler 820 within a compile-time environment 805. Compiler 820 translates source code 810 into byte codes 830. In general, source code 810 is translated into byte codes 830 at the time source code 810 is created by a software developer.

Byte codes 830 may generally be reproduced, downloaded, or otherwise distributed through a network, e.g., network 1012 of FIG. 6, or stored on a storage device such as primary storage 1034 of FIG. 6. In the described embodiment, byte codes 630 are platform independent. That is, byte codes 830 may be executed on substantially any computer system that is running a suitable virtual machine 840. By way of example, in a Java™ environment, byte codes 830 may be executed on a computer system that is running a Java™ virtual machine.

Byte codes 830 are provided to a runtime environment 835 which includes virtual machine 840. Runtime environment 835 may generally be executed using a processor such as CPU 1032 of FIG. 6. Virtual machine 840 includes a compiler 842, an interpreter 844, and a runtime system 846. Byte codes 830 may generally be provided either to compiler 842 or interpreter 844.

When byte codes 830 are provided to compiler 842, methods contained in byte codes 830 are compiled into machine instructions, as described above. On the other hand, when byte codes 830 are provided to interpreter 844, byte codes 830 are read into interpreter 844 one byte code at a time. Interpreter 844 then performs the operation defined by each byte code as each byte code is read into interpreter 844. In general, interpreter 844 processes byte codes 830 and performs operations associated with byte codes 830 substantially continuously.

When a method is called from an operating system 860, if it is determined that the method is to be invoked as an interpreted method, runtime system 846 may obtain the method from interpreter 844. If, on the other hand, it is determined that the method is to be invoked as a compiled method, runtime system 846 activates compiler 842. Compiler 842 then generates machine instructions from byte codes 830, and executes the machine-language instructions. In general, the machine-language instructions are discarded when virtual machine 840 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps associated with the various methods of the present invention may be altered. Specifically, steps associated with creating a compressed object, reading from an object, and writing to an object may generally be modified, reordered, removed, and added.

In determining whether a compressed object has a forwarded format, e.g., points to an uncompressed version of itself, a bit in the header of the compressed object may be read. As discussed above, such a bit may be set to indicate that the compressed object points to an uncompressed version of itself. It should be appreciated that the use of such a bit may be optional. In other words, a determination of whether a compressed object has a forwarded format may be made in substantially any suitable manner. For example, the compressed object may include a field which is either null or contains a forwarding pointer to an uncompressed version of the object. Such a field may be read to identify whether a forwarding pointer exists and to identify the location of any uncompressed version of the object.

Further, it should be appreciated that in addition to identifying whether a compressed object has an associated uncompressed format, a bit in the header may further be arranged to be indicative of other useful information. By way of example, the bit may be additionally arranged to indicate whether or not the object has previously been compressed and substantially immediately been uncompressed. Alternatively, a separate bit may be arranged to identify whether the object has been quickly uncompressed once it has been compressed. That is, a bit may be arranged to indicate whether it is worthwhile to compress the object, which has a forwarded object, again if the opportunity presents itself. In one embodiment, a bit which indicates whether it may be worthwhile to compress the object again may be separate from a bit which indicates whether a forwarding pointer is in existence.

The use of a bit in a header of a compressed object to identify the existence of an associated uncompressed object is optional. In some cases, rather than checking a bit in the header to determine the existence of an uncompressed object that corresponds to the compressed object, a particular field in the body of the object may instead be checked. For example, a particular field in the body may be arranged to be null unless it contains a forwarding pointer. Alternatively, a particular field in the body may instead be arranged to contain a bit that identifies the existence of an associated uncompressed object.

A bit in the header of either a compressed object or an uncompressed object may also be arranged to identify whether the object is changed frequently or infrequently, e.g., whether the object is often written to. When the bit in the header of an uncompressed object indicates that an object is changed infrequently, and the object is compressible, a determination may be made to compress the object because the likelihood that the object would need to uncompressed in the near term would be considered to be low. Alternatively, if the bit in the header of an uncompressed object indicates that the object is often written to, it may be determined that compressing the object is not desirable, as it may be necessary to uncompress the object in the near term if data that is to be written to the object is not compressible.

While an uncompressed object has been described as being compressible substantially only when all fields included in the object may be compressed, it should be understood that in some embodiments, it may be possible to compress an object which does not include only compressible fields. For instance, in one embodiment, an object which includes all compressible fields, with the exception of one field which may not be compressed, may be considered to be a compressible object without departing from the spirit or the scope of the present invention.

A compressed object has been described as being as small as approximately one quarter of the size of an uncompressed object. However, in different embodiments, the size of compressed object may vary widely with respect to the size of an uncompressed version of the compressed object. In one embodiment, the compressed object may be approximately half the size of an associated uncompressed object. The compressed object may even be larger than half the size of an associated uncompressed object, while still being smaller than the associated uncompressed object. In another embodiment, the compressed object may be smaller than one-quarter the size of an uncompressed object.

The size of a compressed object relative to a corresponding uncompressed object may vary depending upon the extent to which uncompressed values are to be compressed. By way of example, while a four byte integer value has been described as being compressed to be expressed as a single signed byte, the four byte integer may instead be compressed to be expressed as two bytes. Similarly, a compressed format pointer, e.g., a difference between a heap location of a pointee and a heap location of the compressed object, has been described as being expressed as a single byte, such a pointer may instead be expressed as two bytes.

In general, an object-based system which includes both uncompressed objects and compressed objects includes at least one heap which stores the uncompressed objects and at least one separate heap which stores the compressed objects. Although the use of separate heaps is generally preferred, in some cases, uncompressed objects and compressed objects may share a heap. In other words, instead of being stored in separate heaps, uncompressed objects and compressed objects may be stored in a common heap.

Although the creation of a compressed object has been described as occurring during a copying phase of a garbage collection process, a compressed object may be created during other processes as well. For example, a compressed object may be created during initial allocation, or during substantially any process which requires copying an object. Once a compressed object is created, the heap space associated with the uncompressed version of the newly compressed object may either be explicitly freed for reallocation, or the heap space may be freed during a subsequent garbage collection process. Therefore, the present examples are to be considered as illustrative and not restrictive, and the invention is not to be limited to the details given herein, but may be modified within the scope of the appended claims.

What is claimed is:

1. A method for creating a compressed version of an object, the object being arranged to store a first representation of a set of data, the object being stored on a heap structure of an object-based computing system, the method comprising:

determining when the first representation of the set of data is suitable for compression;

compressing the first representation of the set of data to form a second representation of the set of data when it is determined that the first representation of the set of data is suitable for compression;

allocating a second portion of memory on the heap structure when it is determined that the first representation of the set of data is suitable for compression, wherein the second portion of memory is substantially smaller than a first portion of memory associated with the object; and writing the second representation of the set of data into the allocated second portion of memory.

2. A method as recited in claim 1 further including:

resetting a pointer that identifies the object to identify the allocated second portion of memory; and removing the object from the heap structure.

3. A method as recited in claim 1 wherein the heap structure includes a first heap and a second heap, and the object is stored on the first heap.

4. A method as recited in claim 3 wherein the allocated second portion of memory is allocated on the second heap.

5. A method as recited in claim 1 wherein the allocated second portion of memory is a compressed object, the method further including writing information into a field associated with the compressed object.

6. A method as recited in claim 5 wherein writing the information includes:

compressing the information; and storing the information in the field.

7. A method as recited in claim 5 wherein writing the information includes:

determining when the information is compressible;

allocating a third portion of memory on the heap structure when it is determined that the information is not compressible, the allocated third portion of memory being substantially larger than the compressed object;

setting a pointer from the compressed object to the allocated third portion of memory;

uncompressing the second representation of data;

storing the uncompressed second representation of data into the allocated third portion of memory; and storing the information into the allocated third portion of memory.

8. A method as recited in claim 7 wherein the allocated third portion of memory is an uncompressed object and writing the information further includes setting a bit in a header of the compressed object to identify an existence of the uncompressed object.

9. A method as recited in claim 8 further including reading an uncompressed data field from the uncompressed object, wherein reading the uncompressed data field from the uncompressed object includes:

identifying the compressed object;
following the pointer from the compressed object to the uncompressed object; and
obtaining contents of the uncompressed data field.

10. A method as recited in claim 5 further including reading from the compressed object.

11. A computer program product for creating a compressed version of an object, the object being arranged to store a first representation of a set of data, the object being stored on a heap structure of an object-based computing system, the computer program product comprising:
   computer code for determining when the first representation of the set of data is suitable for compression;
   computer code for compressing the first representation of the set of data to form a second representation of the set of data when it is determined that the first representation of the set of data is suitable for compression;
   computer code for allocating a first portion of memory on the heap structure when it is determined that the first representation of the set of data is suitable for compression, wherein the first portion of memory is substantially smaller than a second portion of memory associated with the object;
   computer code for writing the second representation of the set of data into the allocated first portion of memory; and
   a computer readable medium that stores the computer codes.

12. A computer program product as recited in claim 11 further including:
   computer code for resetting a pointer that identifies the object to identify the allocated first portion of memory; and
   computer code for removing the object from the heap structure.

13. A computer program product as recited in claim 11 wherein the heap structure includes a first heap and a second heap, and the object is stored on the first heap, and wherein the computer code for allocating the first portion of memory allocates the first portion of memory on the second heap.

14. A computer program product as recited in claim 11 wherein the allocated first portion of memory is a compressed object, and the computer program product further includes computer code for writing information into a field associated with the compressed object.

15. A computer program product as recited in claim 14 wherein the computer code for writing the information includes:
   computer code for determining when the information is compressible;
   computer code for compressing the information when it is determined that the information is compressible;
   computer code for storing the information in the field when it is determined that the information is compressible
   computer code for allocating a third portion of memory on the heap structure when it is determined that the information is not compressible, the allocated third portion of memory being substantially larger than the compressed object;
   computer code for setting a pointer from the compressed object to the allocated third portion of memory;
   computer code for uncompressing the second representation of data;
   computer code for storing the uncompressed second representation of data into the allocated third portion of memory; and
   computer code for storing the information into the allocated third portion of memory.

16. A computer program product as recited in claim 15 wherein the allocated third portion of memory is an uncompressed object and the computer code for writing the information further includes computer code for setting a bit in a header of the compressed object to identify an existence of the uncompressed object.

17. A computer program product as recited in claim 16 further including computer code for reading an uncompressed data field from the uncompressed object, wherein the computer code for reading the uncompressed data field from the uncompressed object includes:
   computer code for identifying the compressed object;
   computer code for following the pointer from the compressed object to the uncompressed object; and
   computer code for obtaining contents of the uncompressed data field.

18. An object-based computer system for creating a compressed version of an object, the object being arranged to store a first representation of a set of data, the object-based computer system comprising:
   a heap structure arranged to store the object;
   a compression mechanism arranged to determine when the first representation of the set of data is suitable for compression, the compression mechanism further being arranged to compress the first representation of the set of data to form a second representation of the set of data when it is determined that the first representation of the set of data is suitable for compression;
   an allocator arranged to allocate a first portion of memory on the heap structure when it is determined that the first representation of the set of data is suitable for compression, wherein the first portion of memory is substantially smaller than a second portion of memory associated with the object; and
   a writing mechanism arranged to write the second representation of the set of data into the allocated first portion of memory.

19. An object-based computer system as recited in claim 18 further including:
   a pointer setter for resetting a pointer that identifies the object to identify the allocated first portion of memory; and
   a garbage collector for removing the object from the heap structure.

20. An object-based computer system as recited in claim 18 wherein the heap structure includes a first heap and a second heap, and the object is stored on the first heap.

21. An object-based computer system as recited in claim 20 wherein the allocated first portion of memory is allocated on the second heap.

22. A method for performing garbage collection within an object-based computing system, the method comprising:
   traversing at least one heap structure associated with the object-based computing system; and
   copying an object, the object being located on the at least one heap structure, the object including a first representation of a set of information, wherein copying the object includes determining when the object may be represented as a compressed format object, the compressed format object being substantially smaller in size than the object.

23. A method as recited in claim 22 wherein determining when the object may be represented as the compressed format object includes determining when a second representation of the set of information may be created, the second representation being a compressed version of the first representation.

24. A method as recited in claim 23 wherein copying the object further includes:

creating the second representation of the set of information, wherein creating the second representation of the set of information includes reducing the number of bytes associated with the set of information;

allocating memory space on the at least one heap structure, wherein an amount of memory space allocated is less than an amount of memory space associated with the object; and storing the second representation in the memory space allocated on the at least one heap structure.

25. A method as recited in claim 24 wherein copying the object further includes:

resetting a pointer which identifies the object to identify the memory space allocated on the at least one heap structure, wherein the memory space allocated on the at least one heap structure represents the compressed format object.

26. A method as recited in claim 25 further including removing the object from the at least one heap structure.

27. A computer program product for performing garbage collection within an object-based computing system, the computer program product comprising:

computer code for traversing at least one heap structure associated with the object-based computing system;

computer code for copying an object, the object being located on the at least one heap structure, the object including a first representation of a set of information, wherein the computer code for copying the object includes computer code for determining when the object may be represented as a compressed format object, the compressed format object being substantially smaller in size than the object; and a computer readable medium that stores the computer codes.

28. A computer program product as recited in claim 27 wherein the computer code for determining when the object may be represented as the compressed format object includes computer code for determining when a second representation of the set of information may be created, the second representation being a compressed version of the first representation.

29. A computer program product as recited in claim 28 wherein the computer code for copying the object further includes:

computer code for creating the second representation of the set of information, wherein the computer code for creating the second representation of the set of information includes computer code for reducing the number of bytes associated with the set of information;

computer code for allocating memory space on the at least one heap structure, wherein an amount of memory space allocated is less than an amount of memory space associated with the object; and computer code for storing the second representation in the memory space allocated on the at least one heap structure.

30. A computer program product as recited in claim 29 wherein the computer code for copying the object further includes:

computer code for resetting a pointer which identifies the object to identify the memory space allocated on the at least one heap structure, wherein the memory space allocated on the at least one heap structure represents the compressed format object.

31. A computer program product as recited in claim 30 further including computer code for removing the object from the at least one heap structure.

32. A computer program product as recited in claim 27 wherein the computer readable medium is one selected from the group consisting of a data signal embodied in a carrier wave, a hard disk, a CD-ROM, a tape, a computer memory, and a floppy disk.

* * * * *